US006902704B2

(12) United States Patent
Wilson

(10) Patent No.: US 6,902,704 B2
(45) Date of Patent: Jun. 7, 2005

(54) INJECTION PUMP ASSEMBLY FOR A COMBINATORIAL REACTOR AND RELATED METHOD

(75) Inventor: Ronnie E. Wilson, Covington, KY (US)

(73) Assignee: Equistar Chemicals, L.P, Houston, TX (US)

( * ) Notice: Subject to any disclaimer, the term of this patent is extended or adjusted under 35 U.S.C. 154(b) by 673 days.

(21) Appl. No.: 10/085,912

(22) Filed: Feb. 28, 2002

(65) Prior Publication Data

US 2003/0162295 A1 Aug. 28, 2003

(51) Int. Cl.[7] .............................. B01L 3/02; B01L 3/00; B01L 11/00; B01L 9/00; G01N 15/06
(52) U.S. Cl. .......................... 422/100; 422/50; 422/58; 422/63; 422/68.1; 422/81; 422/102; 422/103; 422/104; 422/129; 422/130; 436/43; 436/52; 436/53; 436/54; 436/174; 436/180; 73/1.01; 73/1.02; 73/864; 73/864.01; 73/864.11; 73/864.13; 73/864.23; 251/129.01; 251/213; 251/281; 251/284; 251/286; 251/289; 251/290; 251/291; 251/292; 251/298; 251/304; 251/318; 251/336; 251/339; 137/1; 137/15.17; 137/15.21
(58) Field of Search .............................. 422/50, 58, 63, 422/68.1, 81, 100, 102, 103, 104, 129, 130; 73/1.01, 1.02, 864, 864.01, 864.11, 864.13, 864.23, 864.24, 864.34; 251/129.01, 213, 281, 284, 286, 289, 290, 291, 292, 298, 304, 318, 336, 339, 340, 341, 349; 137/1, 15.17, 15.21; 436/43, 52, 53, 54, 174, 180

(56) References Cited

U.S. PATENT DOCUMENTS 5,716,584 A    2/1998   Baker et al.
5,765,591 A  * 6/1998   Wasson et al. .............. 137/597
5,803,105 A  * 9/1998   Wasson et al. ................. 137/1

OTHER PUBLICATIONS

Endeavor™ Meets the demands of catalyst screening, www.argotech.com/endeavor/files/rigors.htm.

(Continued)

Primary Examiner—Jill Warden
Assistant Examiner—Brian Sines
(74) Attorney, Agent, or Firm—Brooks Kushman P.C.

(57) ABSTRACT

An injection pump assembly 10 in a chemical delivery system for simultaneously delivering reagents into a combinatorial reactor system having multiple injectors. The assembly 10 has a plurality of injectors 12, each injector 12 being in fluid communication with one of the multiple reactors. Each injector 12 has (1) a pump 14 in which a plunger 18 sealingly moves to ingest, store and discharge a flushing solvent 20; (2) a pipette assembly 22 for loading, storing, and discharging one or more reagents into one of the reactors in the combinatorial reactor system, first and second reservoirs for retaining some of the reagents; (3) one or more hollow needles 32, each for selectively delivering a reagent 24 to the first 28 or the second 24 reservoir; (4) a first valve 34 positioned downstream of the first 28 reservoir; and (5) a second valve 36 positioned downstream of the second 30 reservoir. When each valve 34, 36 is in a closed position, the reagents 24, 48 can be stored in isolation from each other. When each valve 34, 36 is in an open position, the reagents 24, 48 may flow through the pipette assembly 22. A 3-way valve 38 is positioned between the pump 14 and the pipette assembly 22. An actuator assembly 46 is in operable communication with each of the plurality of injectors so that the 3-way valves 38 of each injector may be repositioned in unison, thereby delivering precise amounts of the flushing solvent 20 and the reagents 24, 48 in varied or consistent amounts to each reactor in the combinatorial reactor system. The inventive method involves operation of the disclosed injection pump assembly.

18 Claims, 5 Drawing Sheets

U.S. PATENT DOCUMENTS

| | | | |
|---|---|---|---|
| 5,888,830 A | | 3/1999 | Mohan et al. |
| 6,045,671 A | | 4/2000 | Wu et al. |
| 6,126,904 A | * | 10/2000 | Zuellig et al. .............. 422/130 |
| 6,132,686 A | | 10/2000 | Gallup et al. |
| 6,190,619 B1 | * | 2/2001 | Kilcoin et al. .............. 422/131 |
| 6,306,658 B1 | | 10/2001 | Turner et al. |
| 6,326,090 B1 | | 12/2001 | Schultz et al. |
| 6,395,235 B1 | * | 5/2002 | Kilcoin et al. .............. 422/103 |
| 6,605,213 B1 | * | 8/2003 | Ammann et al. ........... 210/222 |

OTHER PUBLICATIONS

Yun, Y.K. and Labadie, J., Parallel Synthesis on Endeavor Hydrogenation of 3–alkylidenylindolin–2–ones, Publication Note, APN #030, Argonaut Technologies, San Carlos, CA.

Endeavor™ Run more reactions in less time, www.argot-ech.com/endeavor/files/morerxns.htm.

* cited by examiner

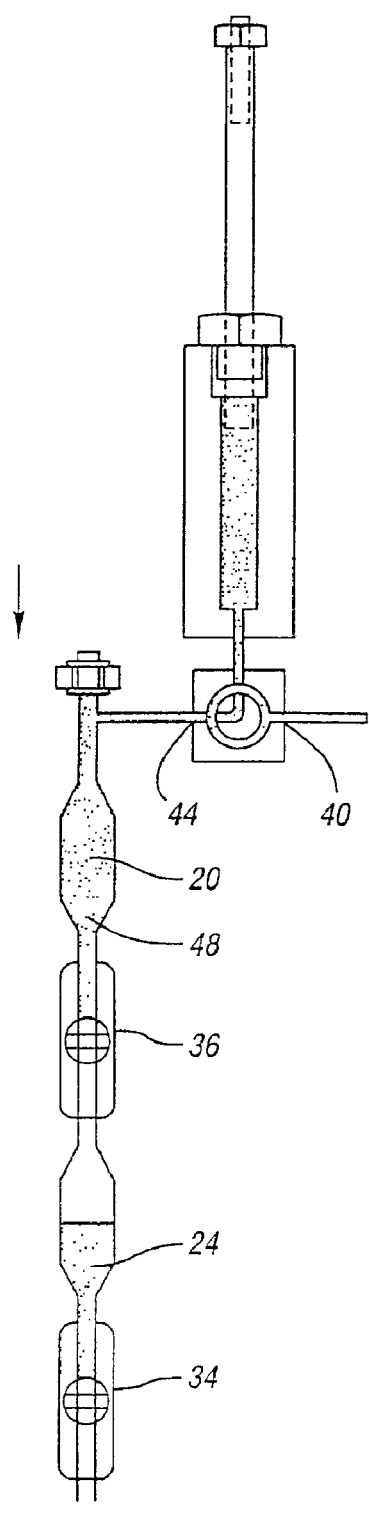
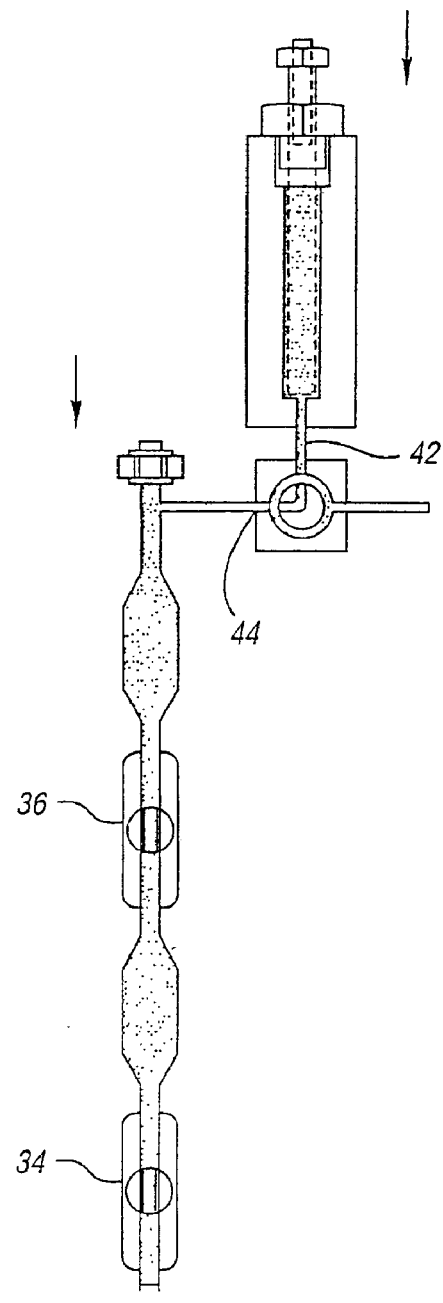
TO REACTOR                TO REACTOR
Fig. 1c                   Fig. 1d

INJECTION PUMP ASSEMBLY FOR A COMBINATORIAL REACTOR AND RELATED METHOD

BACKGROUND OF THE INVENTION

1. Field of the Invention

The invention relates to an injection pump assembly in a chemical delivery system for simultaneously delivering reagents into a combinatorial reactor with multiple reactors. The invention also includes a method of using the assembly.

2. Background Art

The chemical engineer and researcher practice the art and science of, for example, screening catalysts, polymerization of polyolefins, hydrogenation, carbonylation, oxidation, and hydrothermal synthesis. Typically, such processes on a commercial scale occur in reactors with large tanks. In such applications, it is desirable to discover new materials and catalysts more quickly and optimize them. It is known that replication of the environment inside large volume reactors on a smaller scale may facilitate process development.

One approach is to use the techniques of parallel chemistry. This allows the chemical engineer to run more reactions in less time, collect more accurate data, reduce costs, and increase his rate of acquisition of new knowledge.

Depending on the type of research, the requirements for parallel synthesis tools vary. For example, traditional synthetic organic chemists need tools that increase personal productivity without requiring a fundamental change in their work processes. Combinatorial chemistry specialists prefer automation. They desire to implement systems having a higher throughput, combined with reliability and increasingly sophisticated capabilities. Process chemists have another set of needs: automation to control a large number of independent reaction variables.

Argonaut Technologies of Foster City, Calif. makes available a system called Endeavor™ which is used, for example, for catalyst screening. This system brings parallel methodology to catalyst discovery and optimization. It runs eight individual pressurized, gaseous reactions simultaneously, while tracking the gas uptake in each reaction vessel. Used, for example, for polymerization, the system also is applied to such processes as hydrogenation, carbonylation, catalyst screening and other applications where control of temperature, pressure and continuous stirring are vital. Argonaut Technologies, Inc. is licensed by Symyx Technologies of Santa Clara, Calif. to manufacture and sell the Endeavor™ eight-cell-continuous-stirred parallel pressure reactor. This technology has been applied successfully in polymer research efforts, and is applicable to the discovery and optimization of a wide range of materials.

Among the prior art identified in a search that preceded this application are such U.S. Pat. Nos. as 5,716,584; 5,888,830; 6,132,686; 6,045,671; 6,306,658; and 6,326,090. Each is incorporated by reference, to the extent not inconsistent with this specification.

SUMMARY OF THE INVENTION

Against this background, there is a need for a multi-barreled injection pump that can be used with multiple injectors and actuators which pump precise, consistent amounts of any liquid—varied or constant—under pressure, into a combinatorial reactor system.

Accordingly, an injection pump assembly according to the present invention is used to form a delivery system for simultaneously delivery reagents into a combinatorial reactor system (such as the Endeavor™, as noted above) with multiple reactors.

The injection pump assembly includes a plurality of injectors. Each injector is in fluid communication with one of the multiple reactors. Each injector has a pump with a barrel in which a plunger sealingly moves to ingest, store and discharge a flushing solvent.

A pipette assembly loads, stores, and discharges one or more reagents into one of the reactors in the combinatorial reactor system. The pipette assembly has a passage, and first and second reservoirs for retaining at least some of the reagents. The passage is in fluid communication with each reservoir.

A hollow needle extends along the passage for selectively delivering a reagent to the first or the second reservoir. When another reagent is needed, a different needle is used to avoid cross contamination. A first valve is positioned downstream of the first reservoir and a second valve is positioned downstream of the second reservoir. When each valve is in a closed position, the reagents can be stored in isolation from each other. When each valve is in an open position, the reagents and the flushing solvent may flow along the passage into the combinatorial reactor system.

A 3-way valve is positioned between the pump and the pipette assembly. The 3-way valve has a first inlet port that receives the flushing solvent. A second port is connected to the pump, and a third port is connected to the passage.

An actuator assembly is in operable communication with each of the plurality of injectors. The actuator enables the 3-way valves of each injector to be repositioned in unison independently of the first and second valves, the first valves to be repositioned in unison independently of the 3-way valves and the second valves, and the second valves to be repositioned in unison independently of the 3-way valves and the first valves. In this manner, precise amounts of the flushing solvent and the reagents are delivered in varied or consistent amounts to each reactor in the combinatorial reactor system.

The method for simultaneously delivering reagents into the combinatorial reactor system includes operating the injection pump assembly discussed above.

BRIEF DESCRIPTION OF THE DRAWINGS

FIGS. 1a–1d illustrate schematically the stepwise operation of a single injector;

FIGS. 2a–2d illustrate an eight station injector pump during the flushing solvent filling (FIGS. 2a–2b) and discharge (FIGS. 2c–2d) steps.

DETAILED DESCRIPTION OF THE PREFERRED EMBODIMENT(S)

Figure 1A:
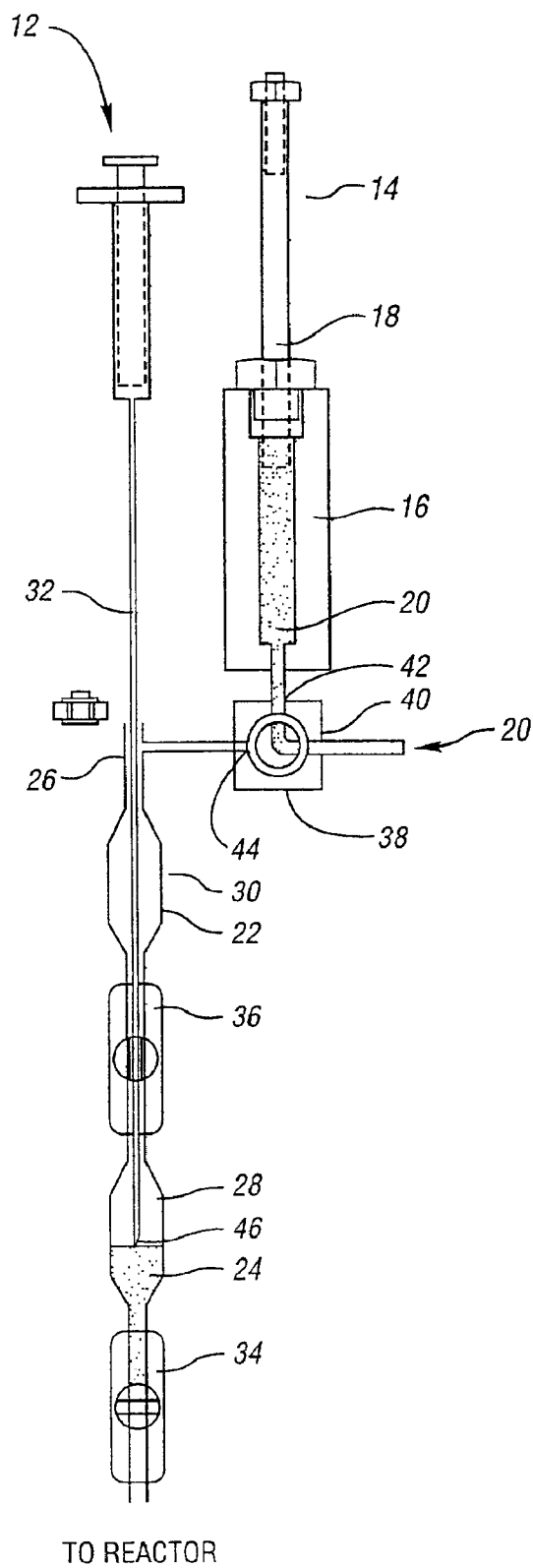
Figure 1B:
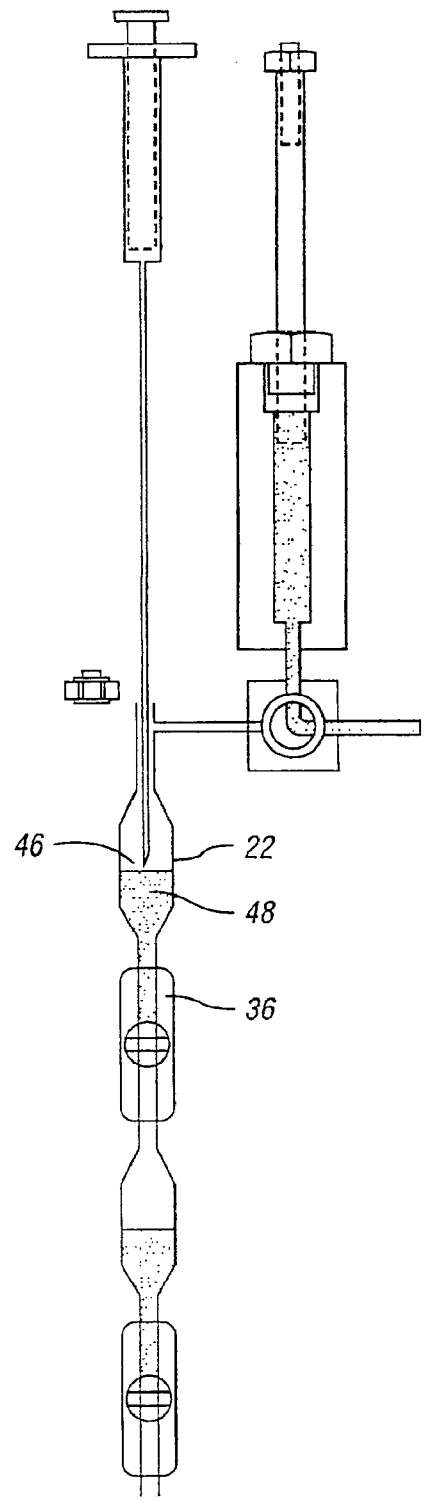

Turning first to FIGS. 1a–1d and 2a–2d of the drawings, an injection pump assembly 10 is depicted for use in a chemical delivery system which simultaneously delivers reagents into a combinatorial reactor system that has multiple injectors. The injection pump assembly 10 has a plurality of injectors 12. Each injector 12 is in fluid communication with one of the multiple reactors (not shown). Each injector 12 has a pump 14 with a barrel 16 in which a plunger 18 sealingly moves to ingest, store and discharge a flushing solvent 20.

Each injector also has a pipette assembly 22 for loading, storing, and discharging one or more reagents 24 into one of the reactors in the combinatorial reactor system. Each pipette assembly has a passage 26 and first and second reservoirs 28, 30 for retaining at least some of the reagents. The passage is in fluid communication with each reservoir.

Extending along the passage 26 are one or more hollow needles 32, each of which may selectively deliver a reagent 24 into the first 28 or second 30 reservoir.

A first valve 34 is positioned downstream of the first reservoir 28. Likewise, a second valve 36 is positioned downstream of the second reservoir. When each valve 34, 36 is in a closed position, the reagents 24, 48 (FIG. 1c) can be stored in isolation from each other. When each valve is in an open position, the reagents may flow along the passage.

Positioned between the pump 14 and the pipette assembly 22 is a 3-way valve 38. This valve has a first inlet port 40 that receives the flushing solvent 20, a second port 42 connected to the pump, and a third port 44 that leads to the passage 26.

Figure 3:
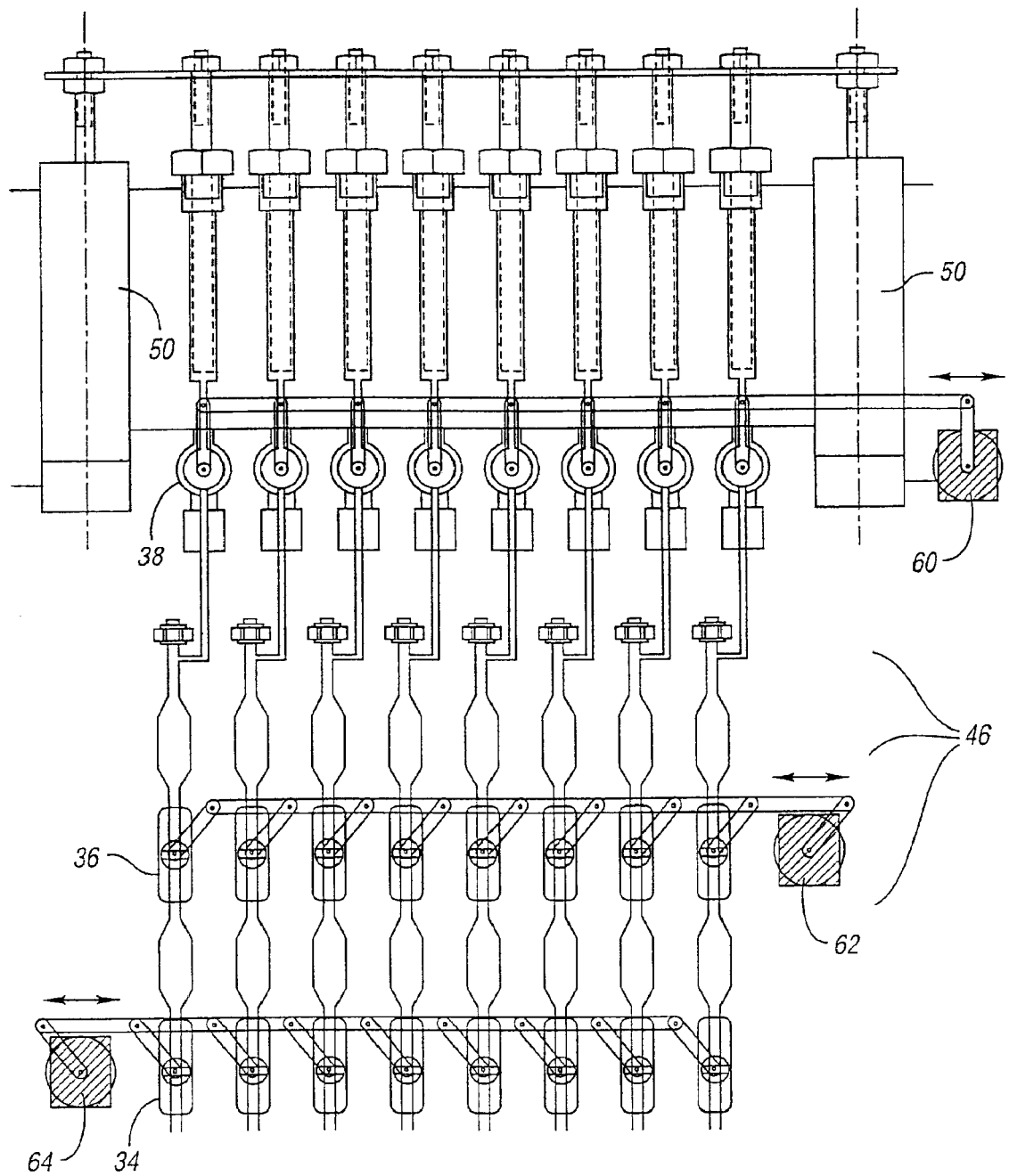
FIG. 3 illustrates the setup of an actuator assembly for an eight injector system.

In operable communication with each of the plurality of injectors 12 is an actuator assembly 46 (FIG. 3). This assembly 46 includes 3 actuators which reposition the 3-way valves of the injectors in unison, reposition the first valves in unison and reposition the second valves in unison.

In this manner, the injection pump assembly 10 delivers precise amounts of the flushing solvent 20 and the reagents 24, 48 in varied or consistent amounts to each reactor in the combinatorial reactor system.

The method using the subject invention is illustrated in FIGS. 1a–1d and includes the following:

(1) closing all valves except the second port 42 of the 3-way valve 38;

(2) opening the first inlet port 40 of the 3-way valve 38 and operating the plunger 18 of the pump 14 so that the flushing solvent 20 at least partially fills the barrel 16 of the pump 14;

(3) opening the second valve 36 and delivering a first reagent 24 into the first reservoir 28 through the needle 32 (FIG. 1a);

(4) withdrawing the needle 32 and inserting a second needle;

(5) closing the second valve 36 and delivering a second reagent 48 into the second reservoir 22 (FIG. 1b) through the second needle and withdrawing the second needle;

(6) closing the first inlet port 40 of the 3-way valve (FIG. 1c);

(7) opening the third port 44 of the 3-way valve 38 (FIG. 1c) (in practice, steps 5–7 reposition the 3-way valve from a fill to a discharge position; steps 6 and 7 are preferably performed in one operation);

(8) opening the first 34 and second valves 36 (FIG. 1d); and (9) expelling the flushing solvent 20 from the pump 14 through the second 42 and third 44 ports, thereby discharging the flushing solvent 20, the first reagent 24, and the second reagent 48 from each injector 10.

Figures 2A, 2B:
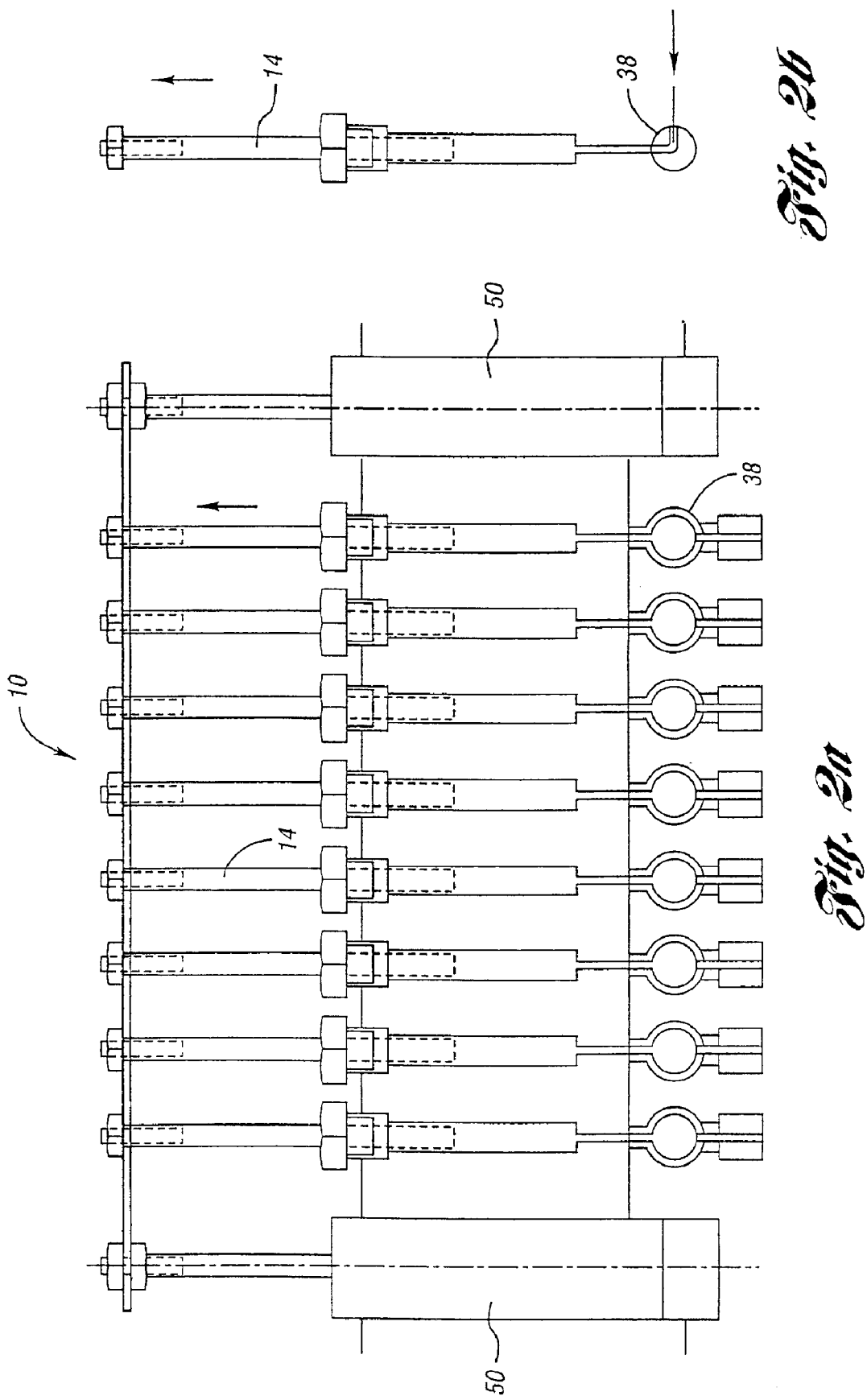
Figure 2B:
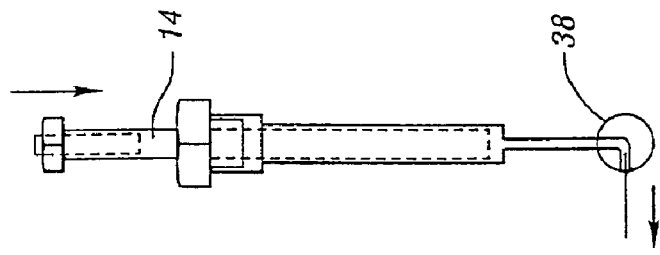
Figure 2C:
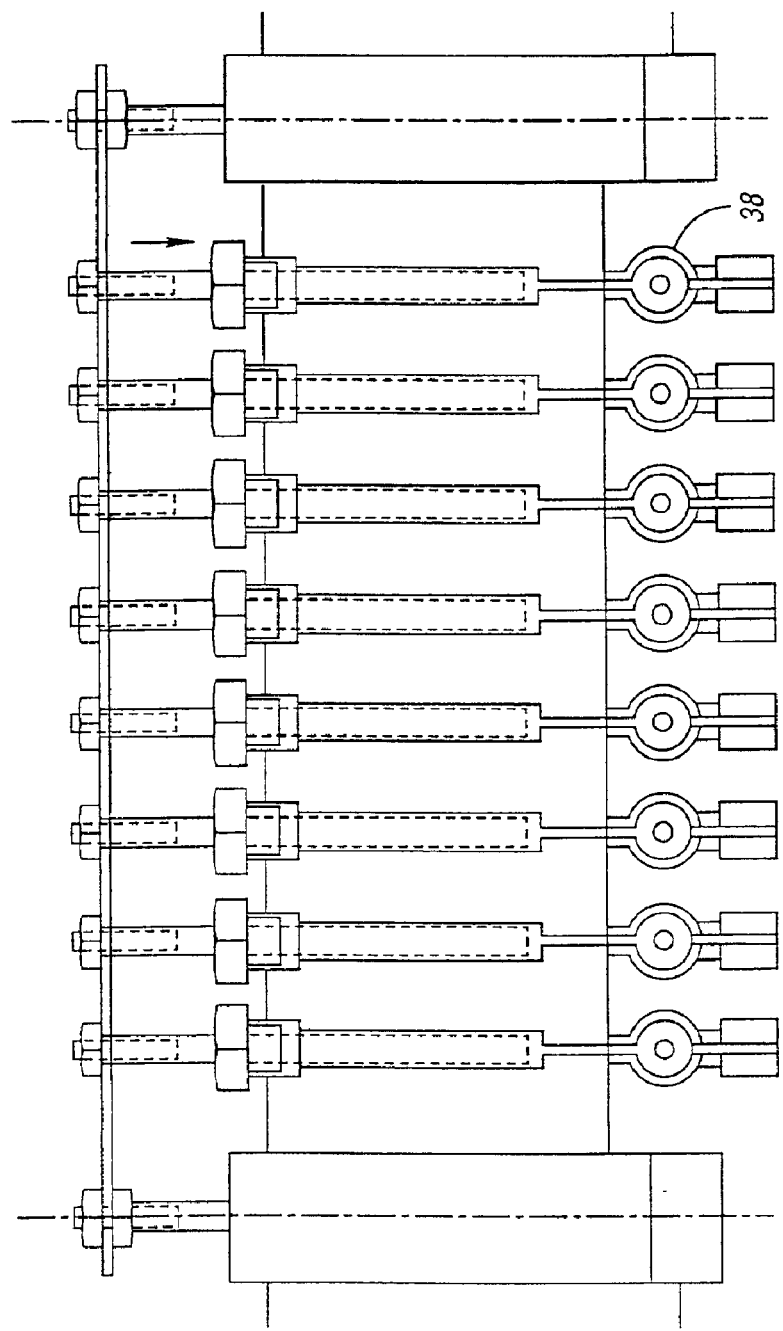

Preferably, the plurality of injectors equals eight (FIGS. 2a, 2c), although it should be appreciated that in theory, any number of injectors is possible depending upon the application and spatial constraints. FIGS. 2a–2b depict simultaneous filling of each injector assembly with the flushing solvent 20. FIGS. 2c–2d depict simultaneous discharge of the flushing solvent through the three-way valves 38. FIGS. 2b and 2d respectively illustrate a representative of one of the injectors during the fill and discharge steps.

While two reservoirs 28, 30 have been described with first 34 and second 36 valves, it should be appreciated that it is possible to deliver more then two reagents by using the same or additional reservoirs and valves as needed.

Preferably, as illustrated in FIGS. 2a–2d, the actuator assembly 46 is communicated with one or more means for energizing the assembly such as cylinders 50 that contain a pneumatic fluid. Preferably, the pneumatic fluid is air, although other methods including mechanical and hydraulic can be used.

FIG. 3 depicts one embodiment of an actuator assembly 46. The 3-way valves 38 are deployed in operable communication with a 180° pneumatic actuator 60. A 90° pnuematic actuator 62 (depicted in a closed position) provides a linkage between the second valves 36. Another 90° pneumatic actuator 64 (depicted in an open position) links the first valve 34 of each injector. While a mechanical linkage has been disclosed in FIG. 3, it will be appreciated that hydraulic, electronic or electrical linkage system will usefully be deployed in alternative embodiments.

Such hydraulic, electronic and electrical embodiments are intended to be included within the disclosed means for energizing the actuator assembly.

While embodiments of the invention have been illustrated and described, it is not intended that these embodiments illustrate and describe all possible forms of the invention. Rather, the words used in the specification are words of description, rather than limitation, and it is understood that various changes may be made without departing from the spirit and scope of the invention.

What is claimed is:

1. An injection pump assembly in a chemical delivery system for simultaneously delivering reagents into a combinatorial reactor system having multiple reactors, comprising:

a plurality of injectors, each injector being in fluid communication with one of the multiple reactors, each injector having
 a pump with a barrel in which a plunger sealingly moves to ingest, store and discharge a flushing solvent;
 a pipette assembly for loading, storing, and discharging one or more reagents and the flushing solvent into one of the reactors in the combinatorial reactor system, the pipette assembly comprising
  a passage
  a first reservoir for retaining at least some of the reagents;
  a second reservoir also for retaining at least some of the reagents, the passage being in fluid communication with each reservoir;
  one or more hollow needles that extend along the passage for selectively delivering a reagent to the first or the second reservoir;
  a first valve positioned downstream of the first reservoir;
  a second valve positioned downstream of the second reservoir;
  so that when each valve is in a closed position, the reagents can be stored in isolation from each other and when each valve is in an open position, the reagents and the flushing solvent may flow along the passage;
 a 3-way valve positioned between the pump and the pipette assembly, the 3-way valve having
  a first inlet port that receives the flushing solvent;
  a second port connected to the pump for ducting the flushing solvent to and from the pump; and a third port connected to the passage for ducting the flushing solvent from the pump; and an actuator assembly in operable communication with each of the plurality of injectors so that the 3-way valves of each injector may be repositioned in unison, the first valves may be repositioned in unison, and the second valves may be repositioned in unison, thereby delivering precise amounts of the flushing solvent and the reagents in varied or consistent amounts to each reactor in the combinatorial reactor system.

2. The injection pump assembly of claim 1 further including:

means for energizing the actuator assembly.

3. The injection pump assembly of claim 2 wherein the means for energizing the actuator assembly comprises a source of compressed air.

4. The injection pump assembly of claim 1 wherein the actuator assembly includes:

a 3-way valve linkage system in operable communication with each 3-way valve;

a second valve linkage system in operable communication with each second valve; and a first valve linkage system which is in operable communication with each first valve.

5. The injection pump assembly of claim 4 wherein the 3-way valve linkage system may reposition the 3-way valves through 180°.

6. The injection pump assembly of claim 4 wherein the second valve linkage system may reposition the second valves through 90°.

7. The injection pump assembly of claim 4 wherein the first valve linkage system may move the first valves through 90°.

8. A method for simultaneously delivering reagents into a combinatorial reactor system having multiple reactors, comprising the steps of:

providing a plurality of injectors, each injector being in fluid communication with one of the multiple reactors, each injector having a pump with a plunger that sealingly moves to ingest, store and discharge a flushing solvent;

a pipette assembly for loading, storing, and discharging one or more reagents into the combinatorial reactor system, the pipette assembly comprising a passage;

first and second reservoirs for retaining at least some of the reagents;

one or more hollow needles that extend along the passage for selectively delivering a reagent to the first or the second reservoir, each needle being positionable within the passage so that it may be in fluid communication with the first, the second or with neither reservoir;

a first and second valves respectively positioned downstream of the first and second reservoirs;

so that when each valve is in a closed position, the reagents can be stored in isolation from each other, and when each valve is in an open position, the reagents may flow along the passage;

positioning a 3-way valve between the pump and the pipette assembly;

deploying an actuator assembly in operable communication with each of the injectors so that the valves may be repositioned in unison, and delivering precise amounts of the flushing solvent and the reagents in varied or consistent amounts to each reactor in the combinatorial reactor system.

9. The method of claim 8, further comprising the steps of:

(1) closing all valves except the second port of the 3-way valve;

(2) opening the first inlet port of the 3-way valve and operating the pump so that the flushing solvent at least partially fills the barrel of the pump;

(3) opening the second valve and delivering a first reagent into the first reservoir through one of the needles;

(4) withdrawing the needle so that its delivery end lies upstream of the second valve;

(5) closing the second valve and delivering a second reagent into the second reservoir through a second needle;

(6) closing the first inlet port of the 3-way valve;

(7) opening the third port of the 3-way valve;

(8) opening the first and second valves; and (9) expelling the flushing solvent from the pump through the second and third ports, thereby urging the flushing solvent, the first reagent, and the second reagent from each injector.

10. The method of claim 8, further comprising the step of:

connecting an air cylinder to the actuator assembly so that the actuator assembly is energized thereby.

11. A delivery system for simultaneously delivering chemical reagents into a combinatorial reactor system having multiple reactors, comprising:

a plurality of injectors, each injector being in fluid communication with one of the multiple reactors, each injector having a pump in which a plunger sealingly moves to ingest, store and discharge a flushing solvent;

a pipette assembly for loading, storing, and discharging one or more reagents into the combinatorial reactor system, the pipette assembly comprising a first reservoir for retaining at least some of the reagents;

a second reservoir also for retaining at least some of the reagents;

a hollow needle for selectively delivering a reagent to the first or the second reservoir, the needle being positionable so that it may be in fluid communication with the first, the second or with neither reservoir;

a first valve positioned downstream of the first reservoir;

a second valve positioned downstream of the second reservoir;

so that when each valve is in a closed position, the reagents can be stored in isolation from each other, and when each valve is in an open position, the reagents may flow through the pipette assembly;

a 3-way valve located between the pump and the pipette assembly, the 3-way valve having a first inlet port that receives the flushing solvent;

a second port connected to the pump; and a third port connected to the passage; and an actuator assembly in operable communication with each of the plurality of injectors so that the 3-way valves of each injector may be repositioned in unison, the first valves may be repositioned in unison independently of the 3-way valves and the second valves, and the second valves may be repositioned in unison independently of the 3-way valves and the first valves, so that precise amounts of the flushing solvent and the reagents may be discharged in synchrony in varied or consistent amounts to each reactor in the combinatorial reactor system.

12. The system of claim 11, further comprising:
a cylinder containing a pneumatic fluid operably communicated to the actuator assembly so that the actuator assembly is motivated thereby.

13. The system of claim 12, wherein the fluid comprises air.

14. The system of claim 12, wherein the fluid comprises a liquid.

15. The injection pump assembly of claim 7 wherein the actuator assembly includes:
a 3-way valve linkage system in operable communication with each 3-way valve;
a second valve linkage system in operable communication with each second valve; and
a first valve linkage system which is in operable communication with each first valve.

16. The injection pump assembly of claim 7 wherein the 3-way valve linkage system may reposition the 3-way valves through 180°.

17. The injection pump assembly of claim 7 wherein the second valve linkage system may reposition the second valves through 90°.

18. The injection pump assembly of claim 7 wherein the first valve linkage system may move the first valves through 90°.

* * * * *